May 19, 1925.
L. W. BELL
1,538,676
GRAIN SAVING ACCESSORY FOR THRASHING MACHINES
Filed July 29, 1924    2 Sheets-Sheet 1
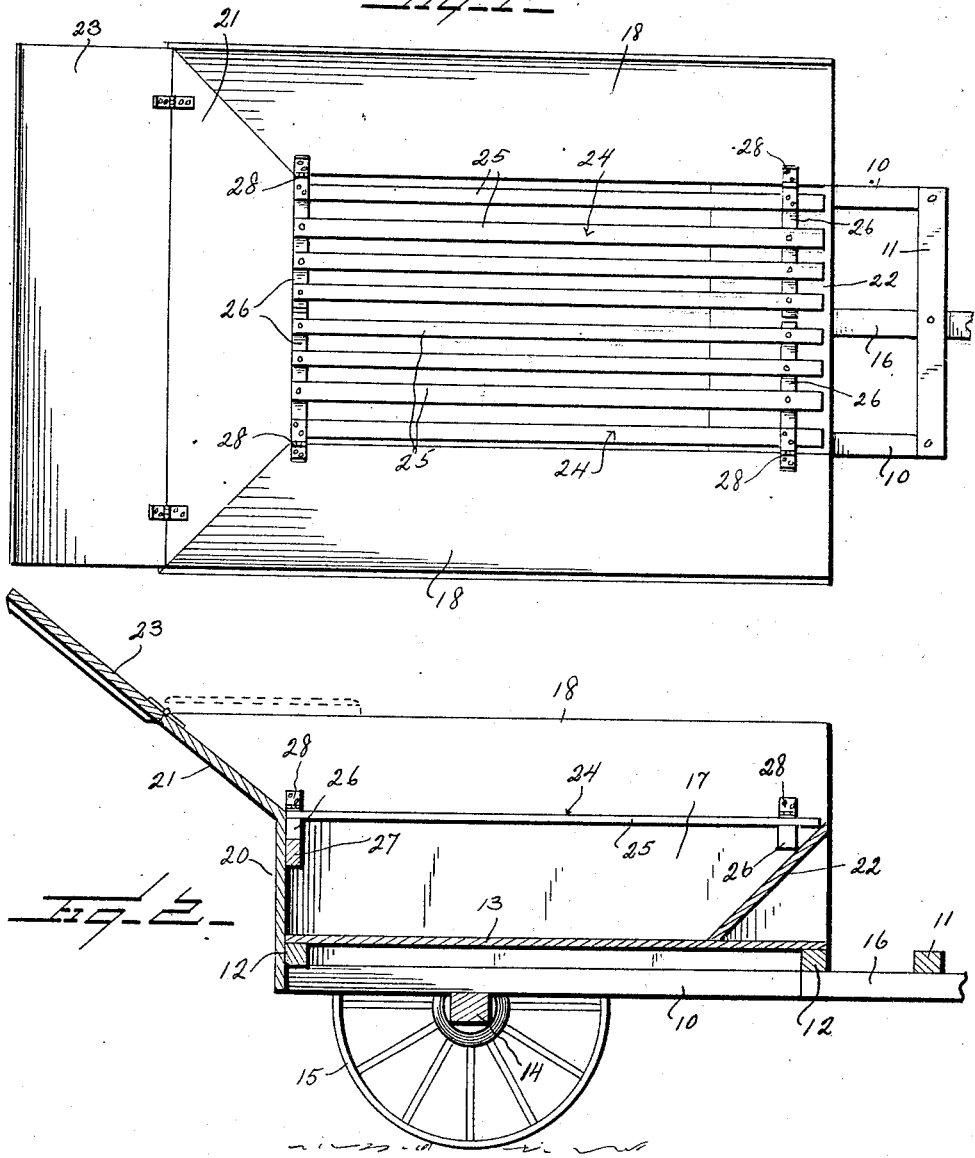
Inventor
*L.W.Bell*
By *Watson E. Coleman*
Attorney May 19, 1925.
L. W. BELL
1,538,676
GRAIN SAVING ACCESSORY FOR THRASHING MACHINES
Filed July 29, 1924    2 Sheets-Sheet 2
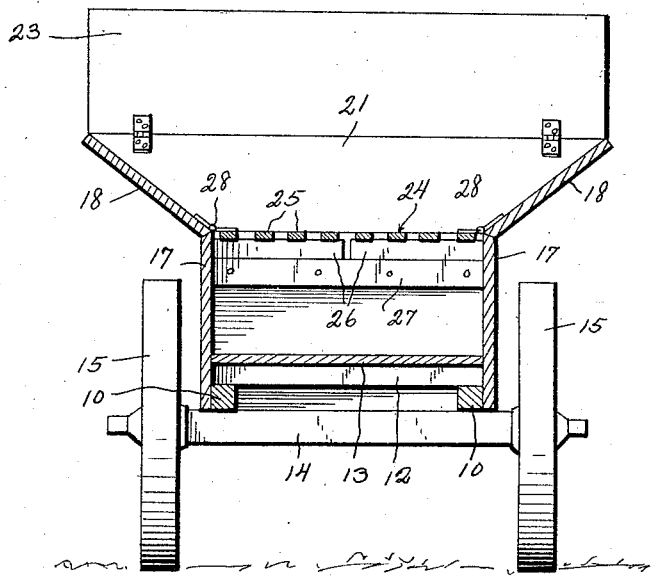
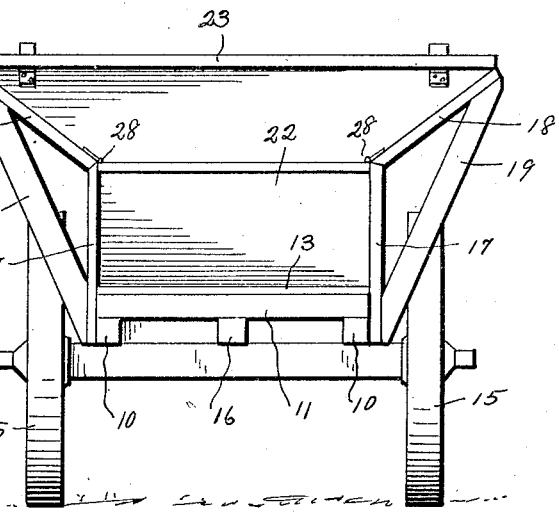
Inventor
L. W. Bell
By Watson E. Coleman
Attorney Patented May 19, 1925.

1,538,676

UNITED STATES PATENT OFFICE.

LORENZO W. BELL, OF CARROLLTON, MISSOURI, ASSIGNOR OF ONE-HALF TO WILLIAM H. GATLIN, OF CARROLLTON, MISSOURI.

GRAIN-SAVING ACCESSORY FOR THRASHING MACHINES.

Application filed July 29, 1924. Serial No. 728,948.

*To all whom it may concern:*

Be it known that I, LORENZO W. BELL, a citizen of the United States, residing at Carrollton, in the county of Carroll and State of Missouri, have invented certain new and useful Improvements in Grain-Saving Accessories for Thrashing Machines, of which the following is a specification, reference being had to the accompanying drawings.

This invention relates to a portable grain saving accessory for thrashing machines, and more particularly to a device for use beneath the feeding platform of a thrashing machine from which a great deal of grain and straw is usually wasted upon the ground.

An important object of the invention is to provide a device of this character which may be readily positioned beneath the feeding platform while the thrasher is in use, and which while the thrasher is transported from place to place may be employed for the transportation of tools and the like to the new field of operation.

A still further object of the invention is to provide a wagon having a body above which is arranged a separating rack, which wagon is adapted to be placed under the feeder of a thrashing machine and which will receive upon its body, and more particularly upon the rack of the body, the straw and grain falling from the feeder. The grain falls through the rack into the body of the wagon and the straw is maintained upon the rack so that it is readily separated. This rack is formed in sections hinged to the body so that they may be swung up to permit removal of the grain or to permit placing of tools, such as forks, shovels and the like, in the body beneath the rack during transportation from place to place.

These and other objects I attain by the construction shown in the accompanying drawings, wherein for the purpose of illustration is shown a preferred embodiment of my invention and wherein:—

Figure 1 is a plan view of a grain saving wagon constructed in accordance with my invention;

Figure 2 is a longitudinal sectional view therethrough;

Figure 3 is a transverse sectional view therethrough;

Figure 4 is a front elevation thereof.

Referring now more particularly to the drawings, the numeral 10 indicates longitudinally extending frame members connected at their forward ends by a transverse member 11, and at the rear end and adjacent the forward end, transverse body supporting members 12 are secured, upon which is seated the bottom 13 of a wagon box. Beneath the longitudinally extending frame members an axle 14 extends transversely thereof to provide a mounting for the supporting wheels 15. The transverse member 12 and the transverse member 11 have attached thereto a draw-bar 16 of any desired construction.

The wagon body has sides 17 which are secured to the bottom 13 and to the longitudinally extending members 10. To the upper ends of these sides are secured outwardly flaring hopper extensions 18 braced to the sides of the body as at 19. The rear end wall of the body, indicated at 20, is vertical and has a similar flaring extension 21 joined at its end edges to the flaring extensions 18 of the side walls. The forward end wall of the body slopes upwardly and forwardly, as indicated at 22, so that the grain contents of the body may be readily removed therefrom by use of a shovel. The upper end of the extension 21 has pivoted thereto a floor-board 23 which may be positioned to form a continuation of the extension 21 or to overlie the body with its side edges resting upon the upper edges of the flaring extensions 18.

Racks 24 are provided, each of a width corresponding to one-half of the transverse width of the body and of the same length as the body, these racks being formed of spaced slats 25 secured together by transversely extending members 26. The racks are supported from the rear end of the body 20 by means of a ledge 27 upon the upper surface of which the under surface of the rearmost transverse members of the racks rest and at their forward ends these racks are supported by engagement of the transverse members 26 with the inclined front wall 22. These racks are pivoted to the extensions 18, as indicated at 28, and may be swung to flatly engage against these extensions when access to the interior of the body beneath the racks is desired.

In the use of the device, the wagon is placed beneath the feeder platform with the rear end next adjacent the thrasher and the floor-board 23 elevated, as indicated, so that it extends well above the feeder platform adjacent the forward end of the thrasher. Grain thrown to the platform will fall either upon the inclined hopper walls 18 or upon the floor-board 23 and will pass downwardly, together with any falling straw, to the racks 24 where the grain will pass through the racks to the interior of the body, while the straw is held suspended by the rack. From time to time this straw may be cleansed from the rack and after the day's work the racks may be thrown open and the collected grain shoveled from the body and, if desired, pass through the thrashing machine to insure its cleansing. When the device is being transported from place to place it may be attached either directly to a suitable tractor or to the thrashing machine to be drawn thereby. During such transportation this device may be employed for carrying tools which may be placed in the body by elevating the racks. Due to the flaring sides of the device a considerable amount of material may be likewise stored thereon above the racks.

Since the device is capable of a considerable range of change and modification without materially departing from the spirit of my invention, I do not limit myself to such specific structure as hereinbefore set forth except as hereinafter claimed.

I claim:—

A grain saving accessory for thrashing machines comprising a relatively deep body having sides and ends, the body at the upper ends of the two sides and one end thereof having inclined extensions at such sides and end combining to form a hopper, braces extending transversely of the body adjacent opposite ends thereof and adjacent the upper ends of the walls thereof and racks pivotally connected to the upper end of the side walls of the body and swingable to a position closing the open top of the body to the entrance of straw but permitting the passage of grain therethrough and in which they are supported by said braces or to a position where they are supported by the sides of said hopper and permit access to the interior of the body.

In testimony whereof I hereunto affix my signature.

LORENZO W. BELL.